(12) United States Patent
Zhu et al.

(10) Patent No.: US 11,418,795 B2
(45) Date of Patent: Aug. 16, 2022

(54) TEMPORAL DOMAIN RATE DISTORTION OPTIMIZATION BASED ON VIDEO CONTENT CHARACTERISTIC AND QP-λ CORRECTION

(71) Applicant: University of Electronic Science and Technology of China, Chengdu (CN)

(72) Inventors: Ce Zhu, Chengdu (CN); Han Qin, Chengdu (CN); Yonghua Wang, Chengdu (CN); Yipeng Liu, Chengdu (CN); Kai Liu, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 17/460,360

(22) Filed: Aug. 30, 2021

(65) Prior Publication Data
US 2022/0046251 A1 Feb. 10, 2022

Related U.S. Application Data

(63) Continuation of application No. PCT/CN2020/132813, filed on Nov. 30, 2020.

(30) Foreign Application Priority Data

Aug. 5, 2020 (CN) .......................... 202010776206.9

(51) Int. Cl.
*H04N 19/147* (2014.01)
*H04N 19/176* (2014.01)
(Continued)

(52) U.S. Cl.
CPC ......... *H04N 19/147* (2014.11); *H04N 19/149* (2014.11); *H04N 19/176* (2014.11); *H04N 19/51* (2014.11)

(58) Field of Classification Search
CPC .. H04N 19/147; H04N 19/149; H04N 19/176; H04N 19/51; H04N 19/19; H04N 19/124
See application file for complete search history.

(56) References Cited

U.S. PATENT DOCUMENTS

| 10,880,551 B2 * | 12/2020 | Topiwala ............. H04N 19/176 |
| 2019/0045192 A1 * | 2/2019 | Socek ................... H04N 19/573 |

FOREIGN PATENT DOCUMENTS

| CN | 105120282 A | 12/2015 |
| CN | 105872544 A | 8/2016 |

(Continued)

OTHER PUBLICATIONS

Guo Hong-Wei, et al., Overview of Rate-Distortion Optimization for Video Coding, Acta Electronica Sinica, 2020, pp. 1018-1029, vol. 48, No. 5.

(Continued)

*Primary Examiner* — Tracy Y. Li
(74) *Attorney, Agent, or Firm* — Bayramoglu Law Offices LLC

(57) ABSTRACT

A temporal domain rate distortion optimization based on video content characteristic and QP-λ correction provides the temporal domain rate distortion optimization based on the video content characteristic and the QP-λ correction for a new generation encoder AV1, wherein according to a previous temporal domain dependency relationship under an HEVC-RA coding structure, a feature of the new generation encoder AV1 and a video sequence feature, an aggregation distortion of a current coding unit and an affected future coding unit is estimated and ta propagation factor of the current coding unit in a temporal domain distortion propagation model is calculated by constructing a temporal domain distortion propagation chain, wherein a Lagrange multiplier is adjusted through a more accurate propagation factor to realize a temporal domain dependency rate distor- (Continued)

tion optimization, and a relationship of QP-λ is re-corrected and an I frame is adjusted to achieve a better coding effect.

1 Claim, 2 Drawing Sheets

(51) Int. Cl.
*H04N 19/51* (2014.01)
*H04N 19/149* (2014.01)

(56) References Cited

FOREIGN PATENT DOCUMENTS

| | | | | |
|---|---|---|---|---|
| CN | 105872545 A | 8/2016 | | |
| CN | 111314703 A | 6/2020 | | |
| CN | 111918068 A | 11/2020 | | |
| RU | 2580088 C2 * | 4/2016 | ....... | H04N 19/00781 |
| WO | 2018065152 A1 | 4/2018 | | |

OTHER PUBLICATIONS

Gary J. Sullivan, et al., Rate-Distortion Optimization for Video Compression, IEEE Signal Processing Magazine, 1998, pp. 74-90.
Yanbo Gao, et al., Source Distortion Temporal Propagation Analysis for Random-Access Hierarchical Video Coding Optimization, Transactions on Circuits and Systems for Video Technology, 2017, pp. 1-14.

* cited by examiner

TEMPORAL DOMAIN RATE DISTORTION OPTIMIZATION BASED ON VIDEO CONTENT CHARACTERISTIC AND QP-λ CORRECTION

CROSS REFERENCE TO THE RELATED APPLICATIONS

This application is a continuation application of International Application No. PCT/CN2020/132813, filed on Nov. 30, 2021, which is based upon and claims priority to Chinese Patent Application No. 202010776206.9, filed on Aug. 5, 2020, the entire contents of which are incorporated herein by reference.

TECHNICAL FIELD

The present invention belongs to the technical field of video coding and decoding, and in particular, relates to temporal domain rate distortion optimization based on video content characteristic and QP-λ correction.

BACKGROUND

The rate distortion theory is the theoretical basis of video coding. The rate distortion theory provides a limit value for information source compression under the condition of given distortion, or the minimum distortion can be reached under the condition of a given code rate. The rate distortion optimization problem is to minimize the distortion of video coding under the limitation of bit consumption and is essentially a constrained optimization problem, and the mathematical expression is shown in a formula:

$$\min\{D\} \text{ s.t. } R \leq R_{max} \quad (1.1)$$

wherein D represents distortion, R represents a coding bit rate, and $R_{max}$ represents the maximum coding bit rate.

However, in actual use, it is relatively difficult to solve the constrained optimization problem, and (Sullivan, et al., 1998) proposed a method for transforming the constrained optimization problem into an unconstrained optimization problem by a Lagrange multiplier method. Fundamentally, the method in Sullivan, et al., 1998) is to convert the bit consumption into distortion by the Lagrange multiplier so as to transform the constrained optimization problem into the unconstrained optimization problem. The rate distortion optimization method proposed in (Sullivan, et al., 1998) is also the most commonly used optimization method in the video coding.

The quantification operation is the main factor of generating distortion in the video coding, and improving the performance of a quantizer is of great significance to improve the coding compression efficiency. Quantification of rate distortion optimization is to find the quantification parameter setting that can minimize the distortion under the constrained condition of the given code rate. In order to determine the optimal quantification parameter of a coding block, the Lagrange multiplier must be determined first. A large number of experiment results show that there is a close relationship between λ and the quantification parameter (QP). However, with the development of the video coding, the introduction of more complex coding structures, such as hierarchical-B coding structure, and different encoders will have a certain influence on the relationship between λ and QP found in (Sullivan, et al., 1998). The corresponding adjustment solution of the relationship between λ and QP is adopted according to different encoders, and the optimal QP is assigned to each specific λ value, so that the coding efficiency is improved.

When the rate distortion optimization method is used, the encoder default situation is that to-be-optimized coding units (coding blocks) are mutually independent, that is, the code rate, distortion and parameter of each coding unit are irrelevant to other units. For example, the coding parameter (such as quantification step size, coding mode, motion vector and the like) of the k-th unit is $o_k$, the corresponding coding bit is $R(o_k)$, the coding distortion is $D(o_k)$, then the above rate distortion optimization problem is transformed into the unconstrained problem of the formula by introducing the global Lagrange multiplier $\lambda_g$, wherein J is called a rate distortion cost function.

In fact, the optimal solution of the above formula may be regarded as a parameter $o_k$ when the function $J_k(\lambda) = D_k(o_k) = \lambda_g R_k(o_k)$ gets the minimum value, and the cost function represents a straight line with a slope being λ on a R-D plane in FIG. 1. In fact, the method for independently processing each coding unit is actually a local optimal method, because each coding unit of the actual video has a dependency relationship.

$$\lambda_g = -\frac{\partial D_k(o_k)}{\partial R_k(o_k)}$$

may be obtained by deriving the formula, and thus it can be seen that $\lambda_g$ is that the larger negative slope $\lambda_g$ of a certain point on a rate distortion cu corresponds to an operable point with smaller code rate and larger distortion, and the smaller $\lambda_g$ corresponds to an operable point with larger code rate and smaller distortion, which is the most important determinant affecting the rate distortion performance; therefore, it is crucial to select the Lagrange multiplier $\lambda_g$. At present, the size of $\lambda_g$ in the AOMedia Video 1 (AV1) is mainly determined by a preset quantification parameter (QP) and is irrelevant to the input video sequence.

However, since intra-frame/inter-frame will introduce dependency among different coding units, and using the independent rate distortion optimization technology for each coding unit cannot achieve the optimal coding performance. Therefore, a global rate distortion optimization method with acceptable complexity is required to further improve the coding efficiency.

A temporal domain rate distortion optimization algorithm under an RA coding structure is studied in the literature Source Distortion Temporal Propagation Analysis for Random-Access Hierarchical Video Coding Optimization. According to the time dependent relationship under the RA configuration, a temporal domain distortion propagation chain under multiple reference frames is established, the distortion propagation degree is estimated, and the propagation factor is calculated, so that the global Lagrange multiplier is adjusted according to the aggregation propagation factor, thereby realizing temporal domain rate distortion optimization and solving the problem about the global rate distortion optimization.

FIG. 2 shows an AV1 default temporal domain hierarchical relationship. Since the size of the AV1 default GOP is 16, except for the frame with the highest temporal domain level, the coding blocks of other frames will directly or indirectly affect the frames with higher temporal domain level and the subsequent frames. (The AV1 default coding structure is similar to the random access video coding of HEVC, and the coding order is inconsistent with the decoding order, so it is necessary to consider forward reference and backward reference. The forward reference is that the playing order of the forward reference frame is greater than the picture order count (POC) of the current frame, and otherwise it is the backward reference.) FIG. 3 shows a main reference relationship in the AV1.

Under the AV1 default coding structure, for the frame with the highest temporal domain level (TL5), that is, the frame with relative POC (rPOC) being 1, 3, 5 . . . 15 (the rPOC appears at the same position of group of pictures (GOP), the optimization problem of the frame is:

$$\min_{o_1} (D_1(o_1) + \lambda_g \cdot R_1(o_1)) \quad (1.3)$$

For the frame with the time level TL4, that is, the frame with rPOC being 2, 6, 10, 14, the optimization problem of the frame is:

$$\min_{o_2} (D_2(o_2) + D_1(o2, o1^*) + D_3(o_2, o_3^*) + \lambda_g \cdot R_2(o_2)) \quad (1.4)$$

For the frame with the time level TL3, that is, the frame with rPOC being 4, 12, the optimization problem of the frame is:

$$\min_{o_4} \begin{pmatrix} D_4(o_4) + D_2(o_4, o_2^*) + D_1(o_4, o_2^*, o_1^*) + \\ D_3(o_4, o_2^*, o_3^*) + D_6(o_4, o_6^*) + D_5(o_4, o_6^*, o_5^*) + \\ D_7(o_4, o_6^*, o_7^*) + \lambda_g \cdot R_4(o_4) \end{pmatrix} \quad (1.5)$$

For the frame with the time level TL2, that is, the frame with rPOC being 8, the optimization problem of the frame is:

$$\min_{o_8} \begin{pmatrix} D_8(o_8) + D_4(o_8, o_4^*) + D_6(o_8, o_4^*, o_6^*) + D_7(o_8, o_4^*, o_6^*, o_7^*) + \\ D_9(o_8, o_9^*, o_{10}^*, o_{12}^*) + D_{10}(o_8, o_{10}^*, o_{12}^*) + D_{12}(o_8, o_{12}^*) + D_{12}(o_8, o_{16}^*) \end{pmatrix} \quad (1.6)$$

For the frame with the time level TL1, that is, the frame with rPOC being 0, 16, the optimization problem of the frame is:

$$\min_{o_{16}} \begin{pmatrix} D_{16}(o_{16}) + D_8(o_{16}, o_8^*) + D_{12}(o_{16}, o_8^*, o_{12}^*) + D_{14}(o_{16}, o_8^*, o_{12}^*, o_{14}^*) + \\ D_{15}(o_{16}, o_8^*, o_{12}^*, o_{14}^*, o_{15}^*) + D_{17}(o_{16}, o_{24}^*, o_{20}^*, o_{18}^*, o_{17}^*) + D_{18}(o_{16}, o_{24}^*, o_{20}^*, o_{18}^*) + \\ D_{20}(o_{16}, o_{24}^*, o_{20}^*) + D_{24}(o_{16}, o_{24}^*) + D_{32}(o_{16}, o_{32}^*) \end{pmatrix} \quad (1.7)$$

Under the condition of high code rate, the coding distortion of the subsequent coding unit may be represented by a formula: $D_{i+1} = e - bR_{i+1} \cdot D_{i+1}^{MCP}$, wherein $D_{i+1}^{MCP}$ is a motion compensation error of a coding unit $B_{i+1}$:

$$D_{i+1}^{MCP} = \|F_{i+1} - \hat{F}_i\|^2 \quad (1.8)$$

$$\approx \alpha \cdot (\|F_{i+1} - F_i\|^2 + \|F_i - \hat{F}_i\|^2)$$

$$\approx \alpha \cdot (D_{i+1}^{OMCP} + D_i)$$

$F_i$ represents an original pixel of the coding unit $B_i$, $\hat{F}_i$ represents a reconstruction pixel of the coding unit $B_i$, and $F_{i+1}$ represents an original pixel of the coding unit $B_{i+1}$.

Because the video coding standard targeted by the algorithm is HEVC, the feature of the new generation encoder AV1 and the video sequence feature are not correspondingly adjusted, the QP-λ relationship in the AV1 is not re-corrected, this algorithm does not adjust the I frame, and the influence of the I frame on the subsequent frames is very important.

SUMMARY

For the above problem, the present invention provides a temporal domain rate distortion optimization method based on a video sequence feature and QP-λ correction for a new generation encoder AV1. According to a temporal domain dependency relationship under an HEVC-RA coding structure, the feature of the AV1 and the video sequence feature, through constructing a temporal domain distortion propagation chain, the aggregation distortion of the current coding unit and the affected future coding unit is estimated, and the propagation factor of the coding unit in a temporal domain distortion propagation model is calculated, so that a Lagrange multiplier is adjusted through the more accurate propagation factor to realize the temporal domain dependency rate distortion optimization, and the relationship of QP-λ is re-corrected and an I frame is adjusted to achieve a better coding effect.

The present invention a technical solution as follows:

a temporal domain rate distortion optimization method based on a video sequence feature and QP-λ correction includes the following specific steps:

S1: A temporal domain propagation chain (as shown in FIG. 4) is established according to a main temporal domain dependency relationship in an AV1 default coding structure, a matching block affected by each original coding block is found through forward motion search, and a corresponding original motion compensation predicted error (OMCP) and a corresponding motion vector are recorded.

S2: A Lagrange multiplier in a relationship model is defined as $\lambda_{new}$ and quantification step size Qstep, the Lagrange multiplier λ of different sequences of different quantification parameters (QP) and the corresponding quantification step size Qstep are counted according to a built-in correspondence list of the QP and the quantification step size Qstep of an encoder, a relationship model between the Lagrange multiplier $\lambda_{new}$ and the quantification step size Qstep is constructed, and the obtained relationship model is represented by formulas (1.9)-(1.10):

$$\lambda_{new} = 3.667 * Qstep^2 - 5.198e - 07 * Qstep - 0.664 \quad (1.9)$$

$$\begin{cases} \lambda_{org} = 1.1 * \lambda_{org}, & |\lambda_{org} - \lambda_{new}| > 100 \text{ or } |\lambda_{org} - \lambda_{new}| < 0.05 \\ \lambda_{org} = 0.95 * \lambda_{org}, & |\lambda_{org} - \lambda_{new}| <= 3 \end{cases} \quad (1.10)$$

wherein $\lambda_{org}$ is the Lagrange multiplier in the encoder.

An original video sequence is briefly classified, the sum of absolute values of difference values of the subsequent 10, 20, 30 . . . similar frames relative to an initial first frame is calculated by a frame difference method, and finally an average value of a pixel level of a cumulative sum is evaluated and represented by E. Different QPs, λ adjustment ranges and corresponding α and I frame QP are set for the obtained result according to a threshold:

$$SAD_i = \sum |p_0 - p_{10*i}| \quad (1.11)$$

$$E = \frac{\sum_{i=1}^{F/10} SAD_i}{W * H * F/10} \quad (1.12)$$

$$\begin{cases} constrainQPrange = 6, & E < 20 \\ constrainQPrange = 2, & 20 \le E < 100 \\ constrainQPrange = 3, & \text{else} \end{cases} \quad (1.13)$$

$$\begin{cases} (0.25 * \lambda_{org}, 4 * \lambda_{org}), & E < 20 \\ (0.63 * \lambda_{org}, 1.59 * \lambda_{org}), & 20 \le E < 100 \\ (0.5 * \lambda_{org}, 2 * \lambda_{org}), & \text{else} \end{cases} \quad (1.14)$$

$$\alpha = clip3(0.90, 0.98, 1 - 0.006 * (0.8 * E - 20)) \quad (1.15)$$

$$\begin{cases} QP_0 - 12 & E < 20 \\ QP_0 - 4 & \text{else} \end{cases} \quad (1.16)$$

wherein $SAD_i$ refers to the sum of an absolute value of the i-th difference value, $p_0$ represents a pixel value of an initial frame, $p_{10*i}$ represents a pixel value of the subsequent 10, 20, 30 . . . frames, the total frame number of the video sequence is represented by F, a width is represented by W, and a height is represented by H. constrainQPrange represents the maximum adjustable range of the QP. A formula (1.13) is the adjustment range of λ, and $\lambda_{org}$ represents λ preset by the AV1. $QP_0$ represents QP (0-255) of the I frame, α represents a coefficient of a formula (1.8), and a clip3( ) function is used to limit the calculation result of 1-0.0006* (0.8*E-20) to be 0.90-0.98.

S3: Before a current frame is actually coded, a propagation factor of each coding block 16×16 of the current frame is calculated by using the original motion compensation error and the motion vector obtained in S1, and an average propagation factor of each Superblock is evaluated by harmonic averaging. Screen content sequences are distinguished by built-in variable of the AV1 because AV1 adopts 2-pass coding by default, and the Lagrange multipliers of different video sequences are pertinently adjusted in combination with the adjustment range obtained in S2.

S4: According to the relationship model obtained in the step S2, $\lambda_{new}$ is defined as the Lagrange multiplier calculated by the relationship model, a difference value of the Lagrange multipliers $\lambda_{org}$ and $\lambda_{new}$ in the encoder is calculated, and for different difference values, the Lagrange multiplier $\lambda_{org}$ in the encoder is corrected by relationship model formulas (1.9)-(1.10).

S5: A frame with rPOC being 16 is coded by a special ALT frame in the AV1, the frame with rPOC being 16 is located at a temporal domain level TL1, similar to the key frame in HEVC, and the distortion of the frame will affect the subsequent multi-frame distortion. Therefore, the ALT frame is scaled and subjected to QP-λ correction on the basis that the AV1 encoder adjusts the block-level Lagrange multiplier in the ALT frame, thereby improving the coding efficiency.

The difference between the solution of the present invention and the previous method includes: different coding strategies are adopted for different sequences, the QP-λ relationship in the AV1 is re-corrected, and adjustment is performed according to the characteristic of the AV1, including adjusting the ALT frame and adjusting the I frame meeting the threshold sequence.

Beneficial effects of the present invention are:

by adopting different coding strategies for different sequences, the influence of each coding block in the current frame on the subsequent coding and correcting the Lagrange multiplier λ in the encoder, the code rate is saved by averagely 1.66% under the version of the AV1 official source code libaom-1.0 and under the Y component.

DETAILED DESCRIPTION OF THE EMBODIMENTS

In order to make the object, technical solutions and advantages of the present invention clearer, the technical solution of the present invention is described below in detail with reference to the accompanying drawings and embodiments. The development environment adopted by the embodiments is Visual Studio 2015, and the embodiments are implemented on the basis of AV1 reference software libaom-1.0.

In order to simplify the implementation method of a global rate distortion algorithm, a global Lagrange multiplier $\lambda_g$ may be directly modified in the AV1 through a propagation factor $\kappa_i$. The subsequent coding unit is not really coded when deducing a propagation factor $\kappa_i$, so it is necessary to estimate the distortion of the subsequent coding unit.

Under the condition of high code rate, the coding distortion of the subsequent coding unit may be represented by a formula: $i+1=e^{-bRi+1} \cdot D_{i+1}^{MCP}$. Since the coding unit $B_{i+1}$ is not coded, $R_{i+1}$ cannot be obtained and $D_{i+1}$ cannot be calculated by a formula, but the coding distortion of $B_{i+1}$ under the quantification step size $Q_{step}$ may be represented as $D_{i+1} = D_{i+1}^{MCP} \cdot F(\theta)$, $$F(\theta) = D_{i+1}/D_{i+1}^{MCP} = e^{-bR_{i+1}} \quad (1.17)$$

wherein $\theta = \sqrt{2}Q_{step}/\sqrt{D^{MCP}}$. A F(θ) curve may be fit through a large number of experiments of the quantification step size and the coding unit. The F(θ) curve of the previous algorithm aims at the HEVC encoder and is no longer applicable to the AV1. An experiment is performed on the AV1 again to obtain a new curve, points on the curve are sampled, and a query table of F(θ) and θ is established, so that the distortion of the coding block is estimated. Meanwhile, according to the present invention, α which is previously set as a fixed value is changed into a which is adaptive according to the video sequence.

Figure 1:
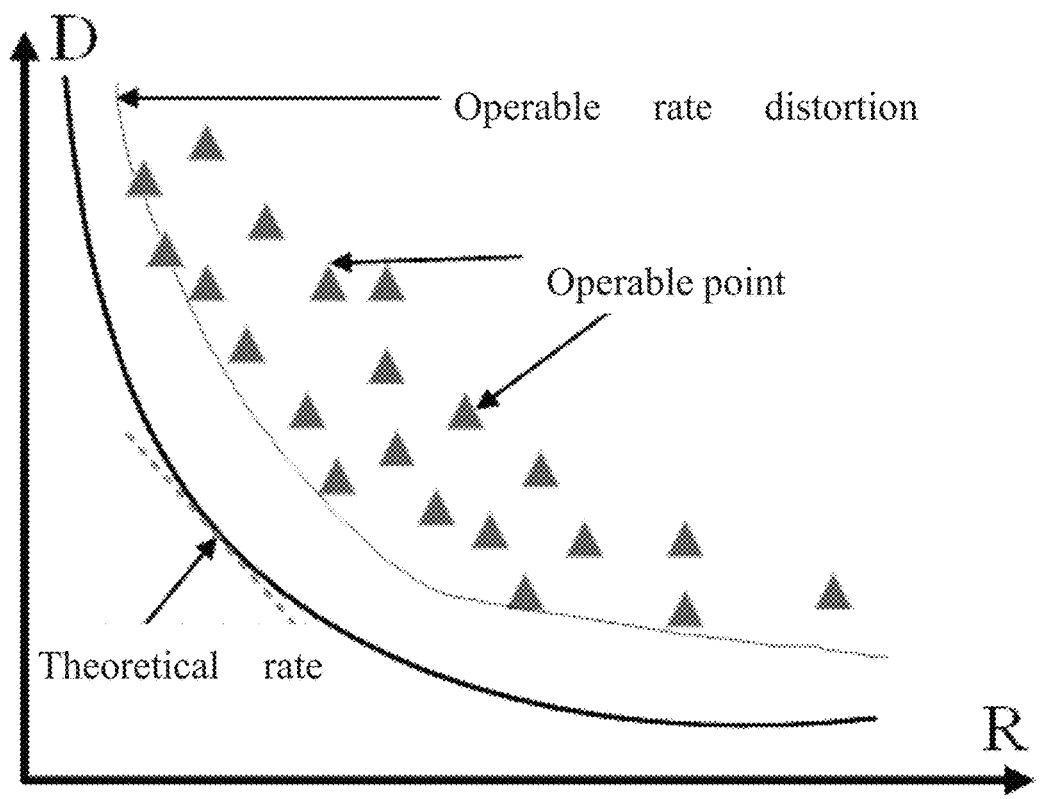
FIG. 1 is a rate distortion curve.
Figure 2:
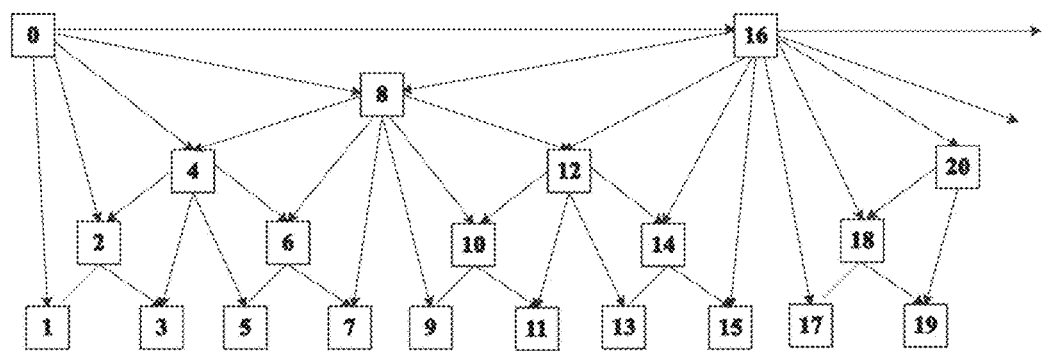
FIG. 2 is an AV1 default coding structure.
Figure 3:
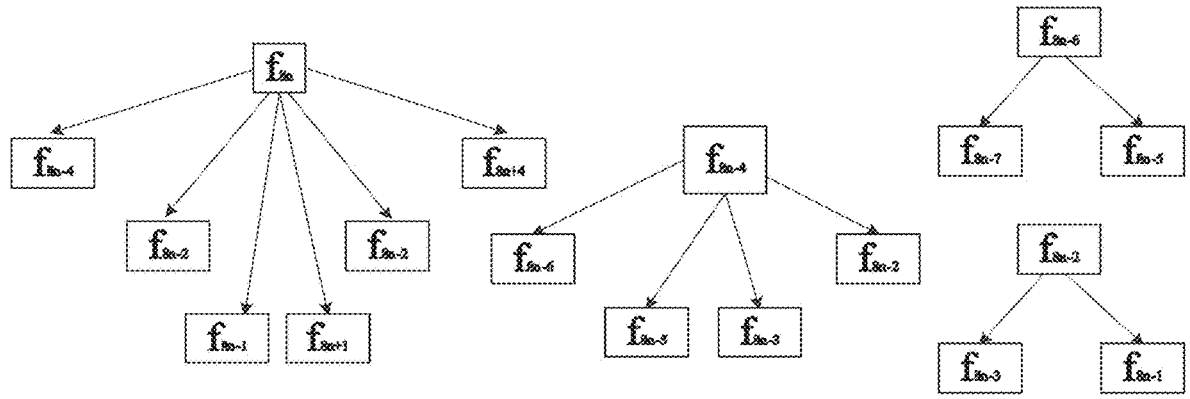
FIG. 3 is a main temporal domain dependency relationship in an AV1.
Figure 4:
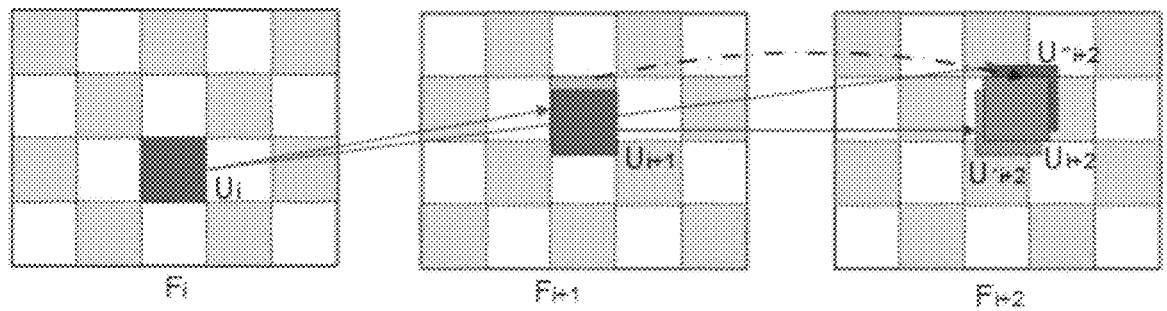
FIG. 4 is a construction schematic diagram of a temporal domain distortion propagation chain.

The main steps of the present invention include:

Step 1: a temporal domain propagation chain (as shown in FIG. 4) is established according to a main temporal domain dependency relationship in an AV1 default coding structure, a matching block affected by each original coding block is found through forward motion search, and a corresponding OMCP and a corresponding motion vector are recorded.

Step 2: A Lagrange multiplier in a relationship model is defined as $\lambda_{new}$ and quantification step size $Q_{step}$, the Lagrange multiplier of different sequences of different QPs and the corresponding quantification step size $Q_{step}$ are counted according to a built-in correspondence list of the QP and the quantification step size Qstep of an encoder, a relationship model between the Lagrange multiplier $\lambda_{new}$ and the quantification step size Qstep is constructed, and the obtained relationship model is represented by formulas (1.9)-(1.10).

Step 3: An original video sequence is briefly classified, the sum of absolute values of difference values of the subsequent 10, 20, 30 . . . similar frames relative to an initial first frame is calculated by a similar frame difference method, and an average value of a pixel level of the cumulative sum is finally evaluated. Different QPs, λ adjustment ranges and corresponding α and I frame QP are set for the obtained result according to a threshold and are represented by formulas (1.11)-(1.16).

Step 4: Before a current frame is actually coded, a propagation factor of each coding block 16×16 of the current frame is calculated by using the original motion compensation error and the motion vector obtained in S1, and an average propagation factor of each Superblock is evaluated by harmonic averaging.

Screen content sequences are distinguished by built-in variable of the AV1 because AV1 adopts 2-pass coding by default, and the Lagrange multipliers of different video sequences are pertinently adjusted in combination with the adjustment range obtained in S21.

Step 5: According to the relationship model obtained in the step S2, $\lambda_{new}$ is defined as the Lagrange multiplier calculated by the relationship model, a difference value of the Lagrange multipliers $\lambda_{org}$ and $\lambda_{new}$ in the encoder is calculated, and for different difference values, the Lagrange multiplier $\lambda_{org}$ in the encoder is corrected by relationship model formulas (1.9)-(1.10).

Step 6: A frame with rPOC being 16 is coded by a special ALT frame in the AV1, the frame with rPOC being 16 is located at a temporal domain level TL1, similar to the key frame in HEVC, and the distortion of the frame will affect the subsequent multi-frame distortion. Therefore, the ALT frame is scaled and subjected to QP-λ correction on the basis that the AV1 encoder adjusts the block-level Lagrange multiplier in the ALT frame, thereby improving the coding efficiency.

When the temporal domain propagation chain is established, motion search is performed by a block of 16×16, and a propagation factor of each block is calculated. In the AV1, the video sequences with the resolution ratio greater than or equal to 720P are independently divided and coded by a SuperBlock of 128×128 and the video sequences with the solution less than 720P are independently divided and coded by a SuperBlock of 64×64, so the propagation factors of all the blocks of 16×16 in the SuperBlock are averaged as the propagation factor of the SuperBlock, and the SuperBlock-level Lagrange multiplier and QP are adjusted. The I frame adjusts part of the sequences according to the threshold.

According to the present invention, AV1 reference software libaom-1.0 serves as an experimental platform, the experimental environment is referenced to the common test conditions (CTC) specified by WET, the experiment is only performed under an AV1 default coding structure, the experiment test sequences are 20 video sequences such as Class B, C, D and E suggested and each test sequence uses four QP points (32, 43, 53 and 63) for coding. The reference software is configured by taking the BasketballDrill sequence as an example, --codec=av1-w832-h480--fps=50/1--cpu-used=1--threads=0--profile=0--drop-frame= 0--static -thresh=0--sharpness=0--frame-parallel=0--tile-columns=0--end-usage=q-v--cq-level=32--ps nr--limit=500-oBasketballDrill_832×480_50.yuv.ivfBasketballDrill_832×480_50.yuv

TABLE 1

The test result of the present invention compared with libaom-1.0

| Class | Sequence name | Resolution rate | BD-rate (%) Y | U | V |
|---|---|---|---|---|---|
| B | Kimono | 1080P | 0.68% | −3.4% | −4.4% |
|  | ParkScene | 1920 × 1080 | −0.12% | −3.0% | −3.2% |
|  | Cactus |  | −2.73% | −11.3% | −9.7% |
|  | BasketballDrive |  | 0.44% | −3.6% | −1.4% |
|  | BQTerrace |  | −0.08% | −7.6% | −10.2% |
|  | Average |  | −0.36% | −5.8% | −5.8% |
| C | BasketballDrill | WVGA | −6.21% | −9.1% | −7.2% |
|  | BQMall | 832 × 480 | −0.29% | −3.8% | −3.3% |
|  | PartyScene |  | −1.34% | −4.2% | −4.0% |
|  | RaceHorses |  | −0.05% | −3.7% | −2.3% |
|  | Average |  | −1.97% | −5.2% | −4.2% |
| D | BasketballPass | WQVGA | 0.29% | −1.1% | −0.2% |
|  | BQSquare | 416 × 240 | −0.53% | −5.2% | −3.6% |
|  | BlowingBubbles |  | −0.51% | −3.5% | −4.0% |
|  | RaceHorses |  | 0.30% | −2.6% | −1.8% |
|  | Average |  | −0.11% | −3.1% | −2.4% |
| E | FourPeople | 720P | −4.45% | −11.3% | −9.1% |
|  | Johnny | 1280 × 720 | −5.66% | −14.9% | −13.7% |
|  | KristenAndSara |  | −4.99% | −13.7% | −12.9% |
|  | Average |  | −5.03% | −13.3% | −11.9% |
| F | BasketballDrillText |  | −5.73% | −8.3% | −6.8% |
|  | ChinaSpeed |  | −0.40% | −4.4% | −3.3% |
|  | SlideEditing |  | −1.44% | −2.5% | −2.3% |
|  | SlideShow |  | −0.42% | −2.1% | −2.3% |
|  | Average |  | −2.00% | −2.1% | −2.3% |
|  | Overall |  | −1.66% | −6.0% | −5.3% |

Figure 5:
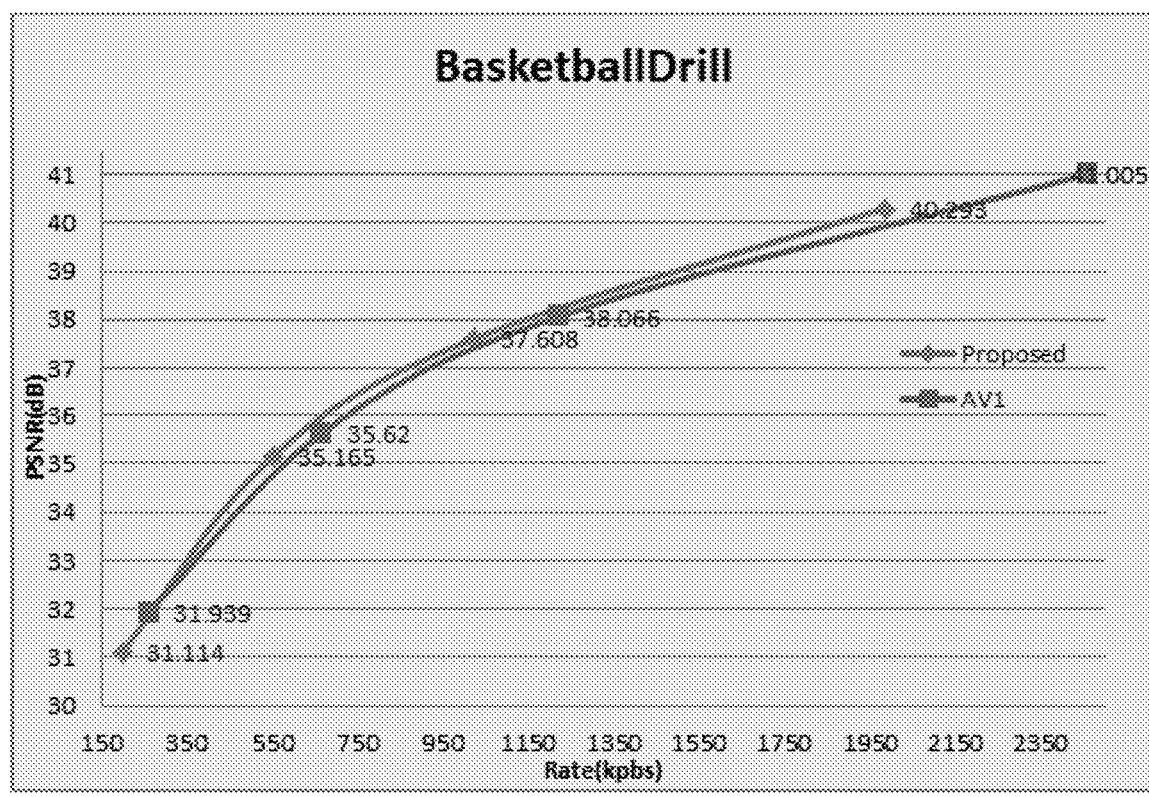
FIG. 5 is a rate distortion curve of a BasketballDrill sequence.

The coding experimental result is shown in Table 1. The table shows the Y component of the test sequence under the AV1 default coding structure achieves 1.66% coding performance. For most test sequences, the performance of the present invention is obviously improved, especially for Class E, the performance is obviously improved, and 5.03% code rate is saved under the Y component. The main reason is that Class E is a video sequence with a relatively fixed scene, each video frame has high similarity and high temporal domain dependency, and the present invention can achieve a better effect for the sequence. In addition, the BasketballDrill sequence saves the code rate by 6.21% under the Y component due to the relatively static background. Then, some sequences are selected, a curve comparison diagram is optimized on the basis of the rate distortion, and the improvement condition of the coding performance of the sequences is observed. As shown in FIG. 5 which is a rate distortion curve diagram of a Basketball- Drill sequence, wherein the x-coordinate is the code rate, the y-coordinate is reconstructed peak signal to noise ratio (PSNR), the blue curve is a rate distortion curve of the global rate distortion optimization algorithm, and the red curve is a rate distortion curve of the original libaom-1.0. It may be seen that for the sequence with strong temporal domain dependency, the coding efficiency of the algorithm is obviously improved.

Similarly, in the aspect of the coding complexity, the coding complexity of the temporal domain rate distortion optimization algorithm under the AV1 default coding structure is reduced by 6% on average, mainly because the adaptive Lagrange multiplier calculated by the algorithm enables the coding unit to achieve better prediction effect. Although it takes a certain amount of time to establish the temporal domain propagation chain, high-quality prediction may reduce the coding residual error, so that a series of processes of transformation, quantification and entropy coding are accelerated, thereby reducing the overall time.

TABLE 2

The coding time percentage of the present invention compared with libaom-1.0

| Sequence | Class B | Class C | Class D | Class E | Class F | ΔEncT |
|---|---|---|---|---|---|---|
|  | 95% | 94% | 97% | 91% | 92% | 94% |

What is claimed is:

1. A temporal domain rate distortion optimization method based on a video content characteristic and QP-λ correction, comprising the following steps:

S1: establishing a temporal domain propagation chain according to a temporal domain dependency relationship in an AV1 default coding structure, finding a matching block affected by each original coding block through a forward motion search, and recording a corresponding original motion compensation error and a corresponding motion vector;

S2: defining a Lagrange multiplier as $\lambda_{new}$ and a quantification step size as Qstep, then counting a Lagrange multiplier λ of a different sequence of a different quantification parameter (QP) and a corresponding quantification step size Qstep according to a built-in correspondence list of the QP and the quantification step size Qstep of an encoder, and constructing a relationship model between the Lagrange multiplier $\lambda_{new}$ and the quantification step size Qstep as follows:

$$\lambda_{new} = 3.667 * Qstep^2 - 5.198e - 07 * Qstep - 0.664;$$

$$\begin{cases} \lambda_{org} = 1.1 * \lambda_{org}, & |\lambda_{org} - \lambda_{new}| > 100 \text{ or } |\lambda_{org} - \lambda_{new}| < 0.05 \\ \lambda_{org} = 0.95 * \lambda_{org}, & |\lambda_{org} - \lambda_{new}| <= 3 \end{cases};$$

wherein $\lambda_{org}$ is a Lagrange multiplier in the encoder; classifying an original video sequence, calculating a sum of absolute values of difference values of subsequent 10, 20, 30 . . . frames relative to an initial first frame by a frame difference method, evaluating an average value of a pixel grade of a cumulative sum as E, and adjusting different QPs, λ adjustment ranges and corresponding α and I frame QP for an obtained result according to a threshold:

$$SAD_i = \sum |p_0 - p_{10*i}|;$$

$$E = \frac{\sum_{i=1}^{F/10} SAD_i}{W * H * F/10};$$

$$\begin{cases} constrainQPrange = 6, & E < 20 \\ constrainQPrange = 2, & 20 \le E < 100 \\ constrainQPrange = 3, & else \end{cases}$$

$$\begin{cases} (0.25 * \lambda_{org}, 4 * \lambda_{org}), & E < 20 \\ (0.63 * \lambda_{org}, 1.59 * \lambda_{org}), & 20 \le E < 100 \\ (0.5 * \lambda_{org}, 2 * \lambda_{org}), & else \end{cases}$$

$$\alpha = clip3(0.90, 0.98, 1 - 0.006 * (0.8 * E - 20));$$

$$\begin{cases} QP_0 - 12 & E < 20 \\ QP_0 - 4 & else \end{cases};$$

wherein $SAD_i$ refers to a sum of an absolute value of an $i^{th}$ difference value, $p_0$ represents a pixel value of an initial frame, $p_{10*i}$ represents pixel values of the subsequent 10, 20, 30 . . . frames, F represents a total frame number of the original video sequence, W represents a width of the original video sequence, H represents a height of the original video sequence, constrainQPrange represents a maximum adjustable range of the QP, $QP_0$ represents a QP (0-255) of an I frame, α is a coefficient, and a clip3( ) function is used to limit a calculation result of 1-0.0006* (0.8*E-20) to be 0.90-0.98;

S3: before a current frame is actually coded, calculating a propagation factor of each coding block 16×16 of the current frame by utilizing the corresponding original motion compensation error and the corresponding motion vector obtained in S1, evaluating an average propagation factor for each Superblock by an harmonic averaging, sorting screen content sequences by a built-in variable of AV1, wherein the AV1 adopts a two-pass coding by default, and pertinently adjusting Lagrange multipliers of different video sequences with an adjustment range obtained in S2;

S4: according to the relationship model obtained in the step S2 and $\lambda_{new}$ being a Lagrange multiplier calculated by the relationship model, calculating a difference value of the Lagrange multipliers $\lambda_{org}$ and $\lambda_{new}$ in the encoder, and for different difference values, correcting the Lagrange multiplier $\lambda_{org}$ in the encoder by utilizing a relationship model formula; and S5: coding a frame with rPOC being 16 by a special ALT frame in the AV1, wherein the frame with rPOC being 16 is located at a temporal domain level TL1, and distortion from the temporal domain level TL1 affect the subsequent multi-frame distortion, scaling and performing QP-λ correction on the special ALT frame on the basis that an AV1 encoder adjusts a block-level Lagrange multiplier in the special ALT frame, thereby improving the coding efficiency.

* * * * *